(12) United States Patent
Rebai et al.

(10) Patent No.: US 8,500,142 B1
(45) Date of Patent: Aug. 6, 2013

(54) WHEEL ASSEMBLY FOR A GOLF BAG

(76) Inventors: Eddie Rebai, Hemet, CA (US); Randall H. Barron, Hemet, CA (US)

( * ) Notice: Subject to any disclaimer, the term of this patent is extended or adjusted under 35 U.S.C. 154(b) by 0 days.

(21) Appl. No.: 13/506,552

(22) Filed: Apr. 28, 2012

(51) Int. Cl.
*B62B 1/00* (2006.01)
(52) U.S. Cl.
USPC ............... 280/47.26; 280/DIG. 6; 280/47.19; 248/96
(58) Field of Classification Search
USPC .......... 280/DIG. 6, 47.26, 47.18, 43.1, 47.24, 280/47.41, 638, 639, 37, 35, 79.11, 62, 63; 301/132, 134–135; 190/107, 114
See application file for complete search history.

(56) References Cited

U.S. PATENT DOCUMENTS

| | | | |
|---|---|---|---|
| 2,902,287 A | 9/1959 | Elias | |
| 3,708,004 A | 1/1973 | Seibold | |
| 3,815,699 A * | 6/1974 | Ganskopp et al. | 180/11 |
| 3,883,150 A | 5/1975 | Varela | |
| 5,112,068 A | 5/1992 | Liao | |
| 5,454,576 A | 10/1995 | Pitkanen | |
| 5,470,095 A | 11/1995 | Bridges | |
| 5,829,585 A | 11/1998 | Kao | |
| 6,056,301 A | 5/2000 | Berliner | |
| 6,279,926 B1 | 8/2001 | Taube | |
| 6,513,816 B1 * | 2/2003 | Kijima | 280/47.26 |
| 6,554,299 B1 | 4/2003 | Bartos | |
| 6,672,600 B2 * | 1/2004 | Engelhardt et al. | 280/47.26 |
| 6,874,798 B2 | 4/2005 | Kang | |
| 7,080,732 B2 | 7/2006 | Bonfanti | |
| 7,114,730 B2 | 10/2006 | Cheldin | |
| 7,500,560 B2 * | 3/2009 | Fair et al. | 206/315.7 |
| 8,152,180 B2 * | 4/2012 | Anspach | 280/47.27 |
| 2003/0234503 A1 | 12/2003 | Chiang | |
| 2004/0178591 A1 | 9/2004 | Rockow | |
| 2005/0121869 A1 * | 6/2005 | So et al. | 280/47.26 |
| 2010/0237576 A1 | 9/2010 | Maccario | |

* cited by examiner

*Primary Examiner* — John Walters
*Assistant Examiner* — James Triggs
(74) *Attorney, Agent, or Firm* — Dennis W. Beech

(57) ABSTRACT

The present invention is may be used for attaching wheels to a golf bag. A bottom plate may have a side member attached at a first edge to extend upwardly. A strap of rigid material may be attached to the top surface of the bottom plate generally parallel to the first edge. A flat bar with an upwardly extending attachment member may be slidably inserted between the strap and the bottom plate to extend outwardly from a second edge that is opposed the first edge. A band of flexible material may be routed through a first band slot in the attachment member and a second band slot in the side member. An axle bracket with a rotatable axle with a wheel rotatably attached at each end is attached to the side member.

8 Claims, 2 Drawing Sheets

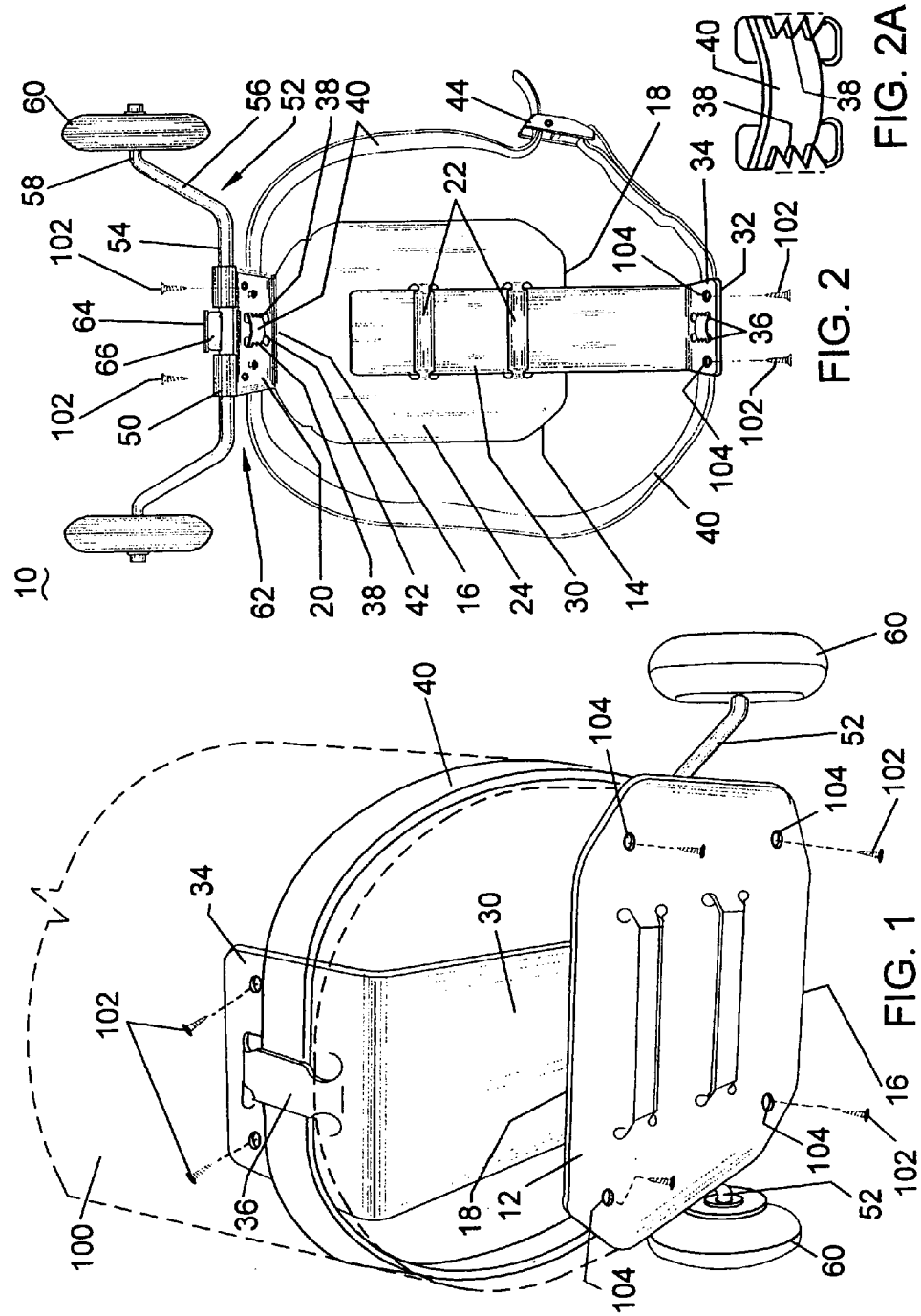

WHEEL ASSEMBLY FOR A GOLF BAG

BACKGROUND OF THE INVENTION

This invention relates to apparatus for attaching wheels to golf bags for use by a person to pull or push a golf bag rather than to carry it for transport. The new wheel assembly may be easily attached and removed from a golf bag for use in moving the golf bag.

Various assemblies, apparatus and structures for attaching wheels on golf bags may be known. Many of these structures are elaborate assemblies that are designed into the structure of the golf bag to which they are attached. The wheels and portions of the structure may extend outwardly and retract into pockets in a golf bag. Other wheels may be permanently attached to a structure that is designed as part of a unique golf bag design and do not retract. Still other wheel devices for golf bags may be attached by straps and the like to the bottom of a golf bag to position wheels for use when the golf bag is tilted at an angle to be moved by rolling the bottom end with wheels on a surface. These latter devices may be simply a strap with a straight axle and wheels or more elaborate base or body with straight axle and wheels for attachment to a golf bag. These type of assemblies may lack sufficient attachment support structure or be overly complicated in body structure. A versatile, attachable plate structural assembly for attachment to a variety of golf bag shapes with easily stored and deployable wheels appears to be needed.

SUMMARY OF THE INVENTION

The present invention is directed to apparatus for attaching wheels to a golf bag. A bottom plate may have a side member attached at a first edge to extend upwardly. A strap of rigid material may be attached to the top surface of the bottom plate generally parallel to the first edge. A flat bar with an upwardly extending attachment member may be slidably inserted between the strap and the bottom plate to extend outwardly from a second edge that is opposed the first edge. A band of flexible material may be routed through a first band slot in the attachment member and a second band slot in the side member. An axle bracket with a rotatable axle with a wheel rotatably attached at each end is attached to the side member.

These and other features, aspects and advantages of the present invention will become better understood with reference to the following drawings, description and claims.

BRIEF DESCRIPTION OF THE DRAWINGS

FIG. 1 illustrates a perspective view of a wheel assembly attached to a golf bag according to an embodiment of the invention;

FIG. 2 illustrates a top perspective view of a wheel assembly according to an embodiment of the invention;

DETAILED DESCRIPTION

The following detailed description represents the best currently contemplated modes for carrying out the invention. The description is not to be taken in a limiting sense, but is made merely for the purpose of illustrating the general principles of the invention.

Figure 3:
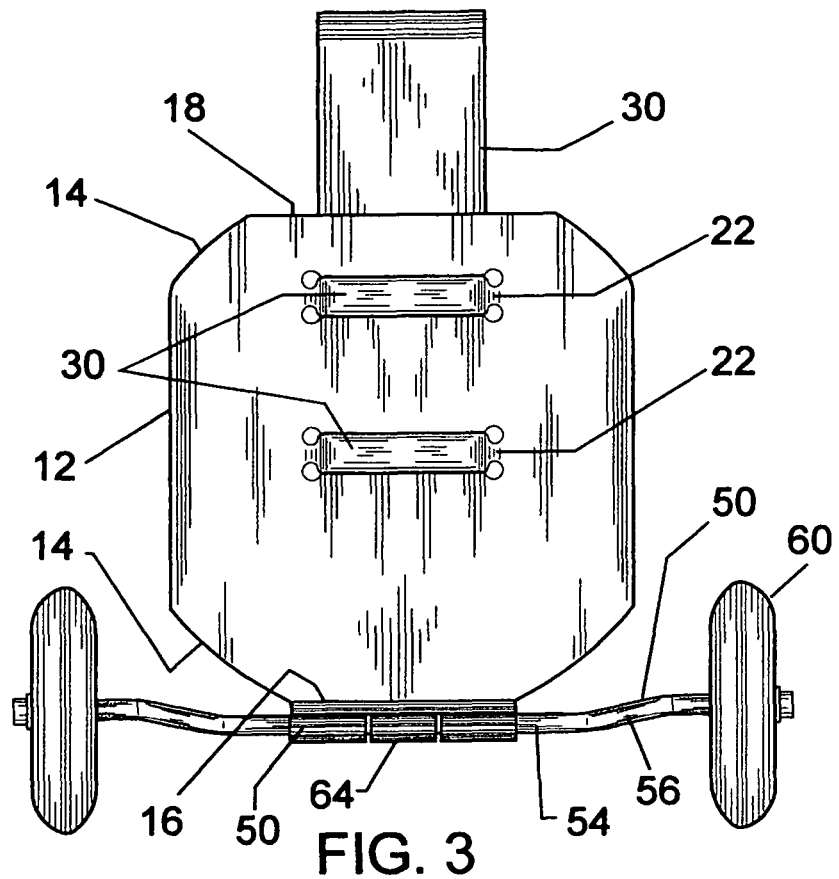
FIG. 3 illustrates a bottom plan view of a wheel assembly according to an embodiment of the invention.
Figure 4A:
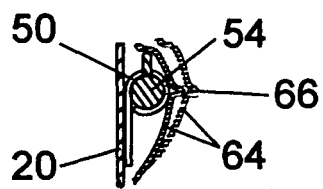
FIG. 4 illustrates a back elevation view of a wheel assembly according to an embodiment of the invention.
Figure 4:
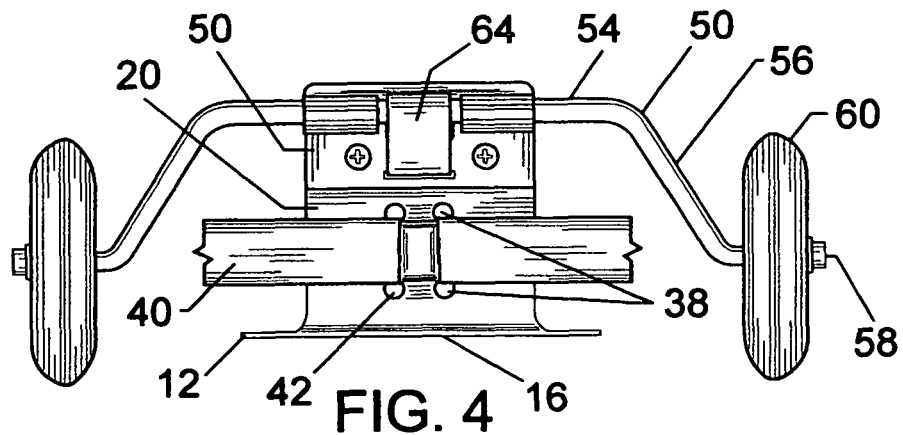

Referring to FIGS. 1 through 4, a wheel assembly 10 for a golf bag 100 may have a bottom plate 12 of generally rectangular shape with beveled or slanted corners 14 and may have a side member 20 extending upwardly from a first edge 16. There may be two straps 22 of a rigid material, for example, metal, composite material or the like, attached to the top surface 24 of the bottom plate 12 that are spaced apart and generally parallel to the first edge 16 and to each other. The straps 22 may also be formed and attached in the bottom plate 12 by cutting slots in the bottom plate 12 material, as can be best viewed in FIG. 3.

A flat bar 30 of rigid material may be slidably inserted under the two straps 22 between the straps 22 and the bottom plate 12 to extend outwardly from a second edge 18 that is opposed the first edge 16. The outwardly extending protruding end 32 of the flat bar 30 may have an attachment member 34 extending upwardly generally orthogonal to the flat bar 30. The attachment member 34 may have a first band slot 36 formed therein for receipt of a band 40 or flexible strap to be fastened around the bottom portion of a golf bag 100. The attachment member 34 may have one or more toothed or roughened surface members 38 protruding toward the side member 20 positioned to engage a bottom portion of a golf bag 100 when the wheel assembly is installed on the golf bag 100 to aid in retention on the golf bag 100. The first band slot 36 and a toothed member 38 may be formed in the attachment member 34 by cutting slots to bend a portion of the material inwardly and to create a strap, see FIGS. 2 and 4.

The side member 20 may have an axle bracket 50 attached with an axle 52 rotatably inserted. The axle 52 may be formed from a rod with a straight center portion 54 and roughly orthogonal portions 56 at each end 58, see FIG. 4. The ends 58 each have a wheel 60 rotationally attached. The axle bracket 50 may have a latch mechanism 62 with a spring catch 64 to engage a tooth 66 or notch on the straight center portion 54 of the axle 52.

The side member 20 may also have a second band slot 42 similar to the first band slot 36 for receipt of the band 40 to be fastened around the bottom portion of a golf bag 100. There may be one or more roughened surface members 38 protruding toward the attachment member 34. The second band slot 42 and a toothed member 38 may be formed in the same way as the first band slot 36, see FIGS. 2 and 4.

In use the bottom plate 12 may be positioned under the bottom of a golf bag 100, which may be circular, oval, generally rectangular or other cross sectional shape, with the side member 20 abutting the bottom wall portion of the golf bag 100. The flat bar 30 with the attachment member 34 may be slid on the bottom plate 12 to engage an opposed bottom wall portion of the golf bag 100, and the band 40 or flexible strap inserted through the first and second band slots 36, 42 is positioned around the bottom portion of the golf bag 100 to be fixed by a buckle or clasp 44. The wheels 60 and axle 52 may be rotated outwardly away from the side member 20 for use in moving the golf bag 100 and can be rotated inwardly or retracted when not needed for such use.

The bottom plate 12 and side member 20 may be formed from a plate of metal material by die stamping or other suitable metal process to form the shape and to then bend the side member upwardly. Also, the straps 22 may be formed by cutting slots in the plate and bending the straps upwardly. The band slots 36, 42 may be similarly formed by cutting slots and bending strap material for the band and bending material to form the roughened surface members 38. In this manner a relatively inexpensive, sturdy wheel assembly 10 may be produced. If a user desires to attach the wheel assembly 10 to a golf bag 100, screws 102 may be inserted through holes 104 that may be formed in the bottom plate 12, or side member 20 and attachment member 34.

While the invention has been particularly shown and described with respect to the illustrated embodiments thereof, it will be understood by those skilled in the art that the foregoing and other changes in form and details may be made therein without departing from the spirit and scope of the invention.

We claim:

1. An apparatus for attaching wheels to a golf bag comprising:
   a bottom plate with a side member attached at a first edge to extend upwardly;
   a first strap of rigid material is disposed generally parallel to said first edge and attached to a top surface of said bottom plate;
   a flat bar is slidably inserted under said first strap disposed between said first strap and said bottom plate to extend outwardly from a second edge opposed to said first edge;
   a protruding end of said flat bar has an attachment member extending upwardly generally orthogonal to said flat bar;
   a band of flexible material is disposed through a first band slot in said attachment member and a second band slot in said side member; and
   an axle bracket with a rotatable axle with a wheel rotatably attached at each end is attached to said side member.

2. The apparatus as in claim 1 wherein a second strap of rigid material is disposed generally parallel and spaced apart from said first strap and attached to said top surface.

3. The apparatus as in claim 1 wherein said side member has a roughened surface member protruding toward said attachment member.

4. The apparatus as in claim 1 wherein said attachment member has a roughened surface member protruding toward said side member.

5. The apparatus as in claim 1 wherein said axle is formed from a rod with a straight center portion partially disposed in said axle bracket and a roughly orthogonal portion formed adjacent each end between said straight center portion and said wheels.

6. The apparatus as in claim 5 wherein there is a latch mechanism disposed with said axle bracket and said axle with a spring latch attached to said bracket to engage a catch on said axle.

7. The apparatus as in claim 1 wherein said bottom plate having a plurality of apertures therein, a fastener is inserted through each of said apertures and attached to a golf bag.

8. The apparatus as in claim 1 wherein said side member and said attachment member having a plurality of apertures therein, a fastener is inserted through each of said apertures and attached to a golf bag.

* * * * *